United States Patent [19]

Eichenauer

[11] 4,315,376

[45] Feb. 16, 1982

[54] DISPLAY DEVICE FOR GREETING CARDS

[76] Inventor: Larry Eichenauer, 6927 Long Point, Houston, Tex. 77050

[21] Appl. No.: 211,521

[22] Filed: Dec. 1, 1980

[51] Int. Cl.³ .......................... G09F 1/10; G09F 3/18; A63H 33/10; A01N 3/00

[52] U.S. Cl. .................................. 40/124.4; 40/10 R; 46/31; 428/19

[58] Field of Search .................. 40/124.4, 10 R, 10 D, 40/124.1, 124, 124.2; 46/31; 428/19, 20; D11/118

[56] References Cited

U.S. PATENT DOCUMENTS

| | | | |
|---|---|---|---|
| D. 256,203 | 8/1980 | Brothers | 40/10 D |
| 1,600,813 | 9/1926 | Flentye | 428/19 |
| 1,881,423 | 10/1932 | Favreau | 428/19 |
| 2,865,122 | 12/1958 | Clawson | 40/124.4 |
| 2,916,843 | 12/1959 | Meyer | 40/124.4 |
| 3,040,459 | 6/1962 | Marcy | 40/124.4 |
| 3,483,742 | 12/1969 | Murray | 40/124.4 |
| 4,196,239 | 4/1980 | Sawyer | 428/19 |

*Primary Examiner*—Robert Peshock

*Assistant Examiner*—Michael J. Foycik

*Attorney, Agent, or Firm*—James L. Jackson

[57] ABSTRACT

A display device for greeting cards, such as Christmas cards, has a plurality of structurally interrelated sheets of relatively rigid sheet material, such as paperboard or the like, which, when assembled, presents the general form and character of a Christmas tree or other decorative feature. Each of the plurality of sheets defines a number of card support slots at the outer portion thereof which are each adapted to receive a single greeting card so that a number of greeting cards are displayed for visual inspection. The plurality of sheets are formed to define slots that are structurally interrelated when the sheets are assembled thereby defining a three-dimensional structure in the general form a Christmas tree with the outer portion of the three-dimensional form adapted to display the greeting cards. The support structure incorporates a base having sheet orienting portions thereof disposed in structurally interrelated relation with respective ones of the plurality of sheets and orienting the sheets in angular relation with respect to adjacent sheets.

5 Claims, 5 Drawing Figures

FIG. 1
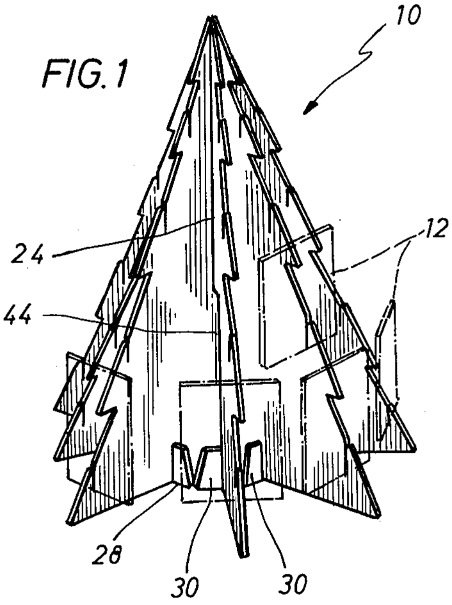
FIG. 2
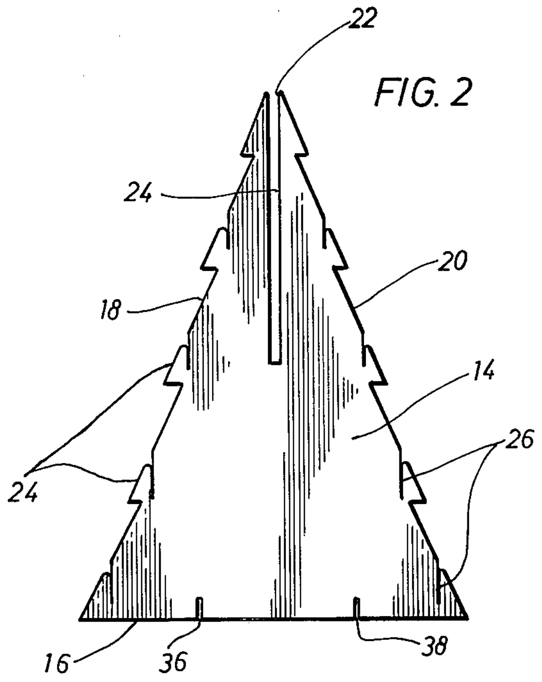
FIG. 3
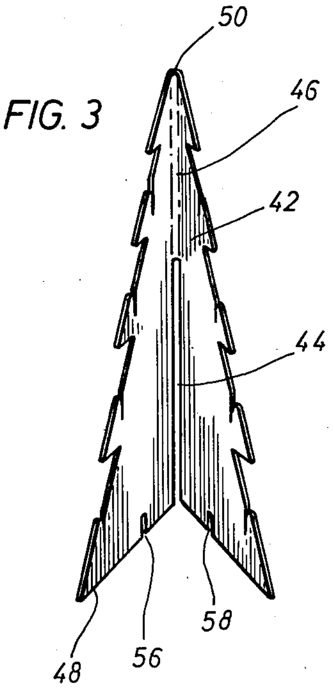
FIG. 4
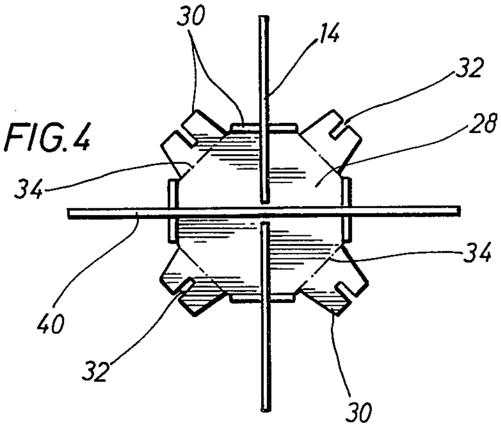
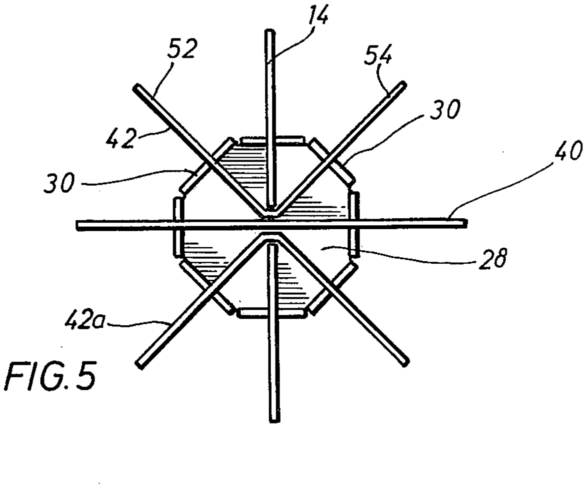
FIG. 5

DISPLAY DEVICE FOR GREETING CARDS

FIELD OF THE INVENTION

This invention relates generally to display devices for objects presented for visual inspection and, more particularly, relates to a three-dimensional display device for greeting cards such as Christmas cards wherein each of the greeting cards supported are positioned for ready visual inspection.

BACKGROUND OF THE INVENTION

Especially during the Christmas season, in the United States, and in other parts of the world where Christianity is a belief and practice for a large number of the population, there has developed the practice of sending greeting cards to one's friends, acquaintances, business associates, etc. This practice is so widely established, in the United States, that it is not unusual for a person, business or a family group to send and receive a large number of greeting cards. Typically, greeting cards received are placed within that appropriate receptacle in order that they may be inspected by members of the family group, friends, acquaintances, etc. In many cases, the large number of greeting cards received become unsightly litter and are disposed of. In other cases, such cards are displayed for the benefit of enjoyment by others. In some cases, in order to display the cards for ready and efficient inspection the recipient may secure a large number of greeting cards to a wall surface, to a door, to draperies or in some other suitable manner display the cards for ready and efficient inspection. Where tape is used to secure the cards to a wall surface, in some cases, removal of the tape leaves tape residue on these surfaces or the tape may actually remove some of the finish of the surface to which the cards are attached. Where the cards are attached to a surface or other structure by means of pins, tacks, etc., of course the surface is penetrated and this can leave small holes in the surface that are unsightly. It is desirable, therefore, to provide a means for suitably and efficiently displaying a large number of greeting cards in order that they may be efficiently inspected and yet providing an efficient means for such display that is not hazardous or destructive to wall surfaces, doors, or other portions of a family dwelling or building structure. It is also desirable to provide a greeting card support structure of suitable, efficient nature which lends to the particular atmosphere that is represented by the greeting cards and the particular season or event to which the greeting cards relate.

SUMMARY OF THE INVENTION

It is, therefore, a principal feature of this invention to provide a novel support structure for greeting cards wherein a large number of greeting cards are supported efficiently in position for optimum viewing without necessitating touching or moving of the cards by persons inspecting the same.

It is also a feature of this invention to provide a novel support device for greeting cards and the like wherein each greeting card is individually supported and may be simply and efficiently removed for more detailed inspection without requiring movement of other ones of the greeting cards so supported.

It is an even further feature of this invention to provide a novel greeting card support device which may be especially adapted for the Christmas season and which is in the general three-dimensional form a Christmas tree with greeting cards being supported from the bottom to top portions thereof.

Among the several features of this invention is contemplated the provision of a novel greeting card support device that is capable of being efficiently assembled from a plurality of flat sheets of fairly rigid sheet material such as cardboard, corrugated paper board, plastic, etc.

It is also an important feature of this invention to provide a novel greeting card support device that is capable of being disassembled and stored efficiently in a small storage space and is capable of being reused a number of times.

It is an even further feature of this invention to provide a novel greeting card support structure that is formed of sheet material and is in the general three-dimensional form of a Christmas tree and which incorporates individual sheets of materials and means for orienting the individual sheets of material in such a manner as to be positioned in angular relation with adjacent sheet elements thereof.

Other and further objects, advantages and features of the present invention will be become apparent to one skilled in the art upon consideration of this entire disclosure. The form of the invention, which will now be described in detail, illustrates the general principals of the invention but it is to be understood that this detailed description is not to be taken as limiting the scope of the present invention.

Briefly, the greeting card support structure of the present invention is a three-dimensional structure which may be generally in the form of a Christmas tree for the purpose of assisting in the decoration effect for the Christmas season. Obviously, for other seasonal effects, the greeting card support device may conveeniently take other general forms as is acceptable to the particular season or event involved. The Christmas tree effect is defined by a plurality of upstanding generally triangular forms having a base edge at the bottom portions thereof and having side portions that taper upwardly to an apex that generally defines the upper portion of the Christmas tree configuration. The various sheets of material are adapted to be positioned in intersecting relation thereby causing sheet portions at each side thereof to define side portions of the upwardly tapering Christmas tree effect. The opposed side portions of each of the sheet elements are formed to define a plurality of slots, each adapted to receive a greeting card in supported relation therein. One of the sheets is identified as a primary sheet and is formed to define a generally vertically oriented slot extending from the apex portion thereof to a position intermediate the apex and the base edge thereof. A transversely intersecting sheet is adapted to be disposed in substantially normal relation with the primary sheet and defines a downwardly opening slot extending from the base edge thereof to a position intermediate the base edge and the apex thereof. This transversely extending sheet is adapted to be positioned in substantially normal relation with respect to the primary sheet and with the downwardly facing slot thereof in interengaging relation with the upwardly extending slot of the primary sheet. Four side portions of the general outline of the Christmas tree configuration are defined by the primary sheet and the transversely intersecting sheet.

The remaining portion of the Christmas tree configuration is defined by a pair of secondary sheets of generally the same configuration as the transversely extending sheet. The secondary sheets are folded along a fold line extending from the center of the base edge to the apex thereof. Each of the secondary sheets is folded in such a manner that sheet portions are defined that are oriented in substantially normal relation with one another. The secondary sheets are then brought into assembly with respect to the upwardly directed slot of the primary sheet and are positioned on either side of the transversely intersecting sheet and function to define four other side portions of the general three-dimensional Christmas tree. A base structure is provided which is also formed of sheet material and which defines a plurality of upstanding tabs each having sheet orienting slots formed therein. Respective ones of the side portions of each of the sheets are received in respective slots of the base portion and therefore the various sheets are supported in such a manner that the angular relationship thereof is effectively maintained and secured. Each of the sheet portions of the Christmas tree effect are positioned in approximately 45° angular relation with respect to the adjacent sheet portions on either side thereof and Christmas tree effect is defined by eight side portions each having a plurality of spaced slots therein for supporting numbers of greeting cards.

BRIEF DESCRIPTION OF THE DRAWINGS

In order that the manner in which the above recited features and advantages of this invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and, therefore, are not to be considered limiting of its scope, for the invention may admit to other equally effective embodiments.

IN THE DRAWINGS

FIG. 1 is an isometric view of a greeting card support structure constructed in accordance with the present invention and showing the various sheets thereof assembled in such a manner as to define a support structure generally in the configuration of a Christmas tree and supporting greeting cards shown in broken line.

FIG. 2 is a side elevational view of the primary sheet of the greeting card support structure of FIG. 1, illustrating the structure thereof in detail.

FIG. 3 is an isometric view illustrating a secondary sheet of the greeting card support structure of FIG. 1, showing the sheet being folded and adapted to be positioned in assembly with the primary sheet.

FIG. 4 is a plan view of the greeting card support structure of FIG. 1 illustrating the primary sheet thereof being positioned in assembly with the transversely intersecting sheet and representing a partially assembled greeting card support structure.

FIG. 5 is a plan view similar to that of FIG. 4 and showing secondary sheets being positioned in assembly with the primary sheet and transversely intersecting sheet and in assembly with the sheet orienting base structure of the greeting card support.

DETAILED DESCRIPTION OF PREFERRED EMBODIMENT

Referring now to the drawings and first to FIG. 1, there is shown a greeting card support structure generally at 10 which provides for support and display of a plurality of greeting cards illustrated in broken line at 12. The greeting card support structure 10 is a three-dimensional form generally of the configuration of a Christmas tree, but may take other suitable forms within the spirit and scope of this invention. The Christmas tree effect is defined by a plurality of intersecting sheets some of which are of flat configuration and others are folded and positioned in structurally interelated relation with the flat sheets. The cooperating sheets define a plurality of sheet portions that cooperate with one another to define the three-dimensional Christmas tree effect.

As shown in FIG. 2, the greeting card support structure 10 includes a primary sheet 14 which is generally in the form of an isosceles triangle having a base edge 16 and having generally equal side portions 18 and 20 that extend upwardly from each side of the base edge 16 to an apex portion 22. The primary sheet 14 is formed to define an upwardly directed slot 24 which extends from the apex portion 22 downwardly to a position intermediate the apex portion and the base edge 16. Each of the side portions 18 and 20 of the primary sheet 14 are formed to define a plurality of projections such as shown at 24 that form the limb effect of a Christmas tree type silhouette. In the vicinity of each of the projections 24, the side portions 18 and 20 of the primary sheet are formed to define upwardly directed card receiving slots 26, each of which being adapted to support an individual greeting card in the manner illustrated in broken line at 12 in FIG. 1. Each of the sheets of the greeting card support device 10 is formed of a substantially rigid sheet material such as paperboard, corrugated board, plastic sheet material or any one of a number of other suitable materials.

The greeting card support structure 10 is provided with a base support structure 28 which may be formed entirely of sheet material as shown or may take any other suitable form. The base portion 28 functions to provide a generally flat surface on which the card support may rest and it functions to maintain each of the plurality of sheets of the card support structure in properly oriented angular relation with respect to one another. As shown in FIG. 4, the base structure 28 incorporates a central portion that is composed of sheet material which may be of the same character as the sheet material defining the various interrelated sheets of the support structure. At the outer periphery of the central portion of the base structure are defined a plurality of sheet orienting tabs 30 each having a sheet orienting slot 32 formed therein. The tabs 30 are adapted to be folded upwardly along fold lines 34 such that the tabs are positioned in substantially normal relation with the central sheet portion of the base structure. When the sheet orienting tabs 30 are positioned in upstanding relation, the various card supporting sheets of the card support structure are positioned in receiving relation within respective ones of the sheet orienting slots 32. The various opposed sheet portions of each of the sheets are then received in oriented and supported relation with respect to the sheet supporting slots of the tabs 30 and are retained in such position. It should be borne in mind that FIG. 4 shows four of the sheet orienting tabs 30 folded along the respective fold lines thereof and positioned in substantially normal relation with the central portion of the base structure. Alternative ones of the sheet orienting tabs 30 are shown to remain unfolded for the purpose of facilitating a ready understanding of the present invention. The central portion and the tab portions of the base structure may be simultaneously die cut from a single sheet of stock. With regard to FIG. 2, it is observed that the lower base edge portion 16 of the primary sheet 14 defines a pair of downwardly directed slots 36 and 38. These downwardly directed slots are adapted to be received in interengaging relation by the various slots 32 of the sheet orienting tabs 30, thereby establishing structural interrelation between the various sheets of the greeting card support structure and the base structure 28 thereof.

As shown in FIGS. 4 and 5, the greeting card support structure 10 is provided with a transversely intersecting sheet 40 that is adapted to be positioned in substantially normal relation with the primary sheet 14. Moreover, the transversely intersecting sheet is formed to define a centrally oriented downwardly opening slot which is adapted to be received in interengaging relation with the corresponding slot 24 of the primary sheet 14. In fact, the transversely intersecting sheet 40 and the folded sheet structure shown in FIG. 3 are of substantially identical configuration with the exception that the transversely intersecting sheet 40 is not folded in any manner but rather is of simple flat configuration with the downwardly directed slot thereof receiving the lower, unslotted portion of the primary sheet 14.

Referring now to FIG. 3, other ones of the sheets forming the greeting card support structure 10 may be identified as secondary sheets 42 having a downwardly directed centrally oriented slot 44 formed therein. The secondary sheets are each adapted to be folded along fold lines 46 that extend from the center of the base edge 48 to the apex portion 50 thereof. As shown in FIG. 5, a pair of secondary sheet structures are shown at 42 and 42*a*. The secondary sheets are shown in assembly with the primary sheet 14, the transversely intersecting sheet 40 and the base structure 28. The secondary sheets are folded in such manner that sheet portions 52 and 54 thereof are disposed in angular relation of substantially 90° included angle. The sheet portions 52 and 54 of the secondary sheets 42 are thus positioned intermediate corresponding sheet portions defined by the primary sheet 14 and the transversely intersecting sheet 40. By virtue of this assembly, each of the sheet portions of the greeting card support structure is oriented in angular relation with each adjacent sheet portion, with each sheet portion being positioned at an included angle of substantially 45° with respect to the adjacent sheet portion on either side thereof. Thus, the greeting card support structure includes eight structurally interrelated sheet portions that generally define a three-dimensional structure having the general appearance of a Christmas tree. As further shown in FIG. 3, the secondary sheets 42 are each formed to define a pair of downwardly directed slots 56 and 58 at the lower base edge portions thereof. These slots 56 and 58 are adapted, respectively, to be received by corresponding slots 32 of respective ones of the sheet orienting tabs 30 in the manner shown in FIG. 5. It should be borne in mind that the upward and downwardly directed interrelated slots of the card support structure may be reversed, if desired, it only being necessary that the sheet parts be capable of structural interrelation.

With the various sheet elements of the greeting card support structure interconnected with the base structure 28 and properly oriented by means of the sheet orienting tabs 30 and the slots 32 formed therein, and with the various slotted portions of the sheets positioned in structurally interrelated relation, the resulting greeting card support structure 10 is of generally rigid character and is capable of standing alone in the position shown in FIG. 1. The greeting card support structure may generally take the form of a Christmas tree, as shown in FIG. 1, for the purpose of representing a decoration that further enhances the typical decorative effects of the Christmas season. It is not intended, however, to limit the general configuration of the greeting card support structure solely to devices having the general appearance of a Christmas tree. Rather, it is intended that greeting card support structures may take any other suitable form that is convenient to the particular season or character of event that is intended to be enhanced by the presence of the greeting card support device. Through utilization of the greeting card support device, a large number of greeting cards are effectively supported by the device and are positioned in such manner as to be readily and efficiently inspected. The individual greeting cards may be simply removed from the support slots and more closely inspected and may then be simply repositioned and properly supported in displayed relation with the support structure. After the support structure has served its purpose, it may be simply and efficiently disassembled and the various components thereof may be stored in a substantially flat container, thereby requiring very little storage space. The support device is reusable a number of times and is capable of being simply and quickly assembled and disassembled without aid of any tools whatever.

I claim:

1. A support structure for greeting cards and the like in the general appearance of a Christmas tree, said support structure comprising:

(a) a plurality of sheets of material each being of generally triangular form and having slots formed therein, said sheets being positionable in interlocking intersecting relation at said slots and cooperating to form a self-standing generally triangular three dimensional structure generally in the form of a Christmas tree, each of said sheets being formed at the outer portions thereof to define a plurality of upwardly opening card slots each adapted to receive and support a greeting card in upstanding position for visual inspection; and (b) a generally horizontal base structure formed of sheet material having twice as many sides as the number of said plurality of sheets, said base structure defining a sheet orienting tab at each of said sides, each of said sheet orienting tabs extending upwardly from said base structure and defining a sheet orienting slot therein, the lower portions of each of said plurality of sheets being received by said sheet orienting slots of two of said sheet positioning tabs and being angularly oriented in predetermined relation by said tabs with respect to adjacent ones of said sheets.

2. A support structure as recited in claim 1, wherein the lower portions of each of said sheets define downwardly opening slot means cooperating with said slots of respective ones of said sheet orienting tabs to establish interengaging relation of said sheets with respective ones of said sheet orienting tabs.

3. A support structure as recited in claim 1, wherein said plurality of sheets comprise:

(a) primary sheet of generally triangular configuration representing the basic silhouette of a Christmas tree and having a base edge adapted to be positioned in generally horizontal manner and an apex defining the top of said Christmas tree, said primary sheet being formed to define an upwardly facing slot extending downwardly from said apex to a position intermediate the apex and base edge; and (b) a plurality of second sheets of a configuration generally corresponding to said triangular configuration of said primary sheet, each of said secondary sheets being formed to define a downwardly facing slot extending from the base edge thereof to a position intermediate said base edge and the apex thereof, each of said secondary sheets being positioned in intersecting relation with said primary sheet and with said downwardly facing slots thereof receiving the upper portion of said primary sheet.

4. A support structure as recited in claim 3, wherein: the base edges of each of said primary and secondary sheets are positioned so as to substantially lie in a common generally horizontal plane.

5. A support structure as recited in claim 3, wherein:

(a) one of said secondary sheets is of substantially flat configuration; and (b) at least one of said secondary sheets is folded along a line extending substantially vertically form said apex to said base edge thereof and defines opposed sheet sections disposed in angular relation with one another.

* * * * *